(12) United States Patent
Lin et al.

(10) Patent No.: US 12,543,174 B2
(45) Date of Patent: Feb. 3, 2026

(54) DATA TRANSMISSION METHOD AND TERMINAL DEVICE

(71) Applicant: GUANGDONG OPPO MOBILE TELECOMMUNICATIONS CORP., LTD., Dongguan (CN)

(72) Inventors: Xue Lin, Dongguan (CN); Cong Shi, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 380 days.

(21) Appl. No.: 18/106,401

(22) Filed: Feb. 6, 2023

(65) Prior Publication Data

US 2023/0189257 A1    Jun. 15, 2023

Related U.S. Application Data

(63) Continuation of application No. PCT/CN2020/107998, filed on Aug. 7, 2020.

(51) Int. Cl.
*H04W 72/1268* (2023.01)
*H04W 72/231* (2023.01)
*H04W 74/0833* (2024.01)

(52) U.S. Cl.
CPC ..... *H04W 72/1268* (2013.01); *H04W 72/231* (2023.01); *H04W 74/0833* (2013.01)

(58) Field of Classification Search
CPC ........................ H04W 72/231; H04W 72/1268

USPC ......................................................... 370/329
See application file for complete search history.

(56) References Cited

U.S. PATENT DOCUMENTS

| | | | | |
|---|---|---|---|---|
| 2018/0139778 | A1* | 5/2018 | Chou | H04W 76/27 |
| 2019/0320488 | A1* | 10/2019 | Mildh | H04W 76/30 |
| 2020/0107268 | A1* | 4/2020 | Lee | H04W 72/1268 |
| 2020/0137760 | A1 | 4/2020 | Shih et al. | |
| 2020/0396633 | A1* | 12/2020 | Tseng | H04L 5/001 |
| 2021/0014926 | A1* | 1/2021 | Xu | H04W 76/10 |
| 2022/0346135 | A1* | 10/2022 | Chen | H04W 72/569 |

(Continued)

FOREIGN PATENT DOCUMENTS

| | | |
|---|---|---|
| CN | 108696937 A | 10/2018 |
| CN | 110139386 A | 8/2019 |

(Continued)

OTHER PUBLICATIONS

Intel Corporation, "Data transmission mechanism for a UE in Inactive", R2-1701745, 3GPP TSG RAN WG2 NR 97 Athens, Greece, Feb. 13-17, 2017.

(Continued)

*Primary Examiner* — Peter G Solinsky
(74) *Attorney, Agent, or Firm* — BAYES PLLC

(57) ABSTRACT

A data transmission method and a terminal device are provided. The method includes: in response to that a terminal device selects to perform a data transmission in an inactive state based on a preconfigured uplink resource, sending, by the terminal device, uplink information to a network device. The uplink information includes at least uplink data to be sent by the terminal device, or the uplink (Continued)

300

S310 — In response to that a terminal device selects to perform a data transmission in an inactive state based on a random access resource, send, by the terminal device, uplink information to a network device, the uplink information including at least uplink data to be sent by the terminal device and identity information of the terminal device information includes at least the uplink data to be sent by the terminal device and identity information of the terminal device.

20 Claims, 4 Drawing Sheets

(56) References Cited

U.S. PATENT DOCUMENTS

| | | | | |
|---|---|---|---|---|
| 2023/0030443 A1* | 2/2023 | Chen | ................. | H04W 74/0833 |
| 2023/0118032 A1* | 4/2023 | Chou | ................. | H04W 74/006 |
| | | | | 370/329 |
| 2023/0156847 A1* | 5/2023 | Zhang | ................. | H04W 76/20 |
| | | | | 370/329 |
| 2023/0189380 A1* | 6/2023 | Palat | ................. | H04W 76/11 |
| | | | | 370/329 |
| 2023/0209464 A1* | 6/2023 | Tsai | ................. | H04W 52/0216 |
| | | | | 370/311 |

FOREIGN PATENT DOCUMENTS

| | | | | |
|---|---|---|---|---|
| CN | 110139387 A | 8/2019 | | |
| CN | 110583043 A | 12/2019 | | |
| CN | 111436139 A | 7/2020 | | |
| EP | 3831143 B1 * | 7/2023 | ............ | H04W 72/04 |
| EP | 3884726 B1 * | 10/2024 | ........... | H04B 17/318 |
| WO | 2020092415 A1 | 5/2020 | | |
| WO | 2021031098 A1 | 2/2021 | | |
| WO | 2021031108 A1 | 2/2021 | | |
| WO | WO-2022031718 A1 * | 2/2022 | ............ | H04W 68/02 |

OTHER PUBLICATIONS

International Search Report issued in International application No. PCT/CN2020/107998, mailed Apr. 25, 2021.
Written Opinion of the International Searching Authority issued in International application No. PCT/CN2020/107998, mailed Apr. 25, 2021.
3GPP TS 36.300 V16.2.0 (Jul. 2020); Technical Specification Group Radio Access Network; Evolved Universal Terrestrial Radio Access (E-UTRA) and Evolved Universal Terrestrial Radio Access Network (E-UTRAN); Overall description; Stage 2 (Release 16).
ZTE Corporation, "Work Item on NR smalldata transmissions in Inactive state", RP-193252, 3GPP TSG RAN Meeting #86 Sitges, Spain, Dec. 9-12, 2019.
Extended European Search Report issued in corresponding European application No. 20948690.1, mailed Jun. 7, 2023.
First Office Action issued in corresponding European application No. 20948690.1, mailed Mar. 14, 2024.
European Patent Minutes Draft issued in corresponding European Application No. 20948690.1, dated Sep. 5, 2024, 4 pages.
Notice of Allowance issued in corresponding European Application No. 20 948 690.1, dated Oct. 4, 2024, 47 pages.
First Review Comments issued in corresponding Chinese Application No. 202411728881.9, mailed on Aug. 14, 2025, 18 pages.

* cited by examiner

200

In response to that a terminal device selects to perform a data transmission in an inactive state based on a preconfigured uplink resource, send, by the terminal device, uplink information to a network device, the uplink information including at least uplink data to be sent by the terminal device, or the uplink information including at least the uplink data to be sent by the terminal device and identity information of the terminal device — S210

In response to that a terminal device selects to perform a data transmission in an inactive state based on a random access resource, send, by the terminal device, uplink information to a network device, the uplink information including at least uplink data to be sent by the terminal device and identity information of the terminal device — S310

FIG. 6

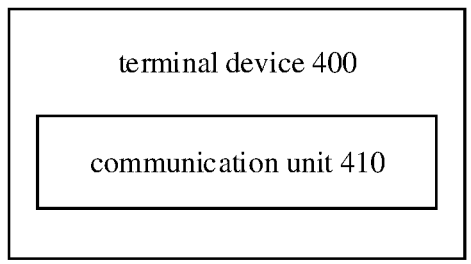

FIG. 7

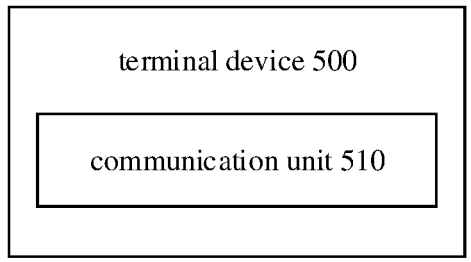

FIG. 8

DATA TRANSMISSION METHOD AND TERMINAL DEVICE

CROSS-REFERENCE TO RELATED APPLICATION

This application is a continuation of International Application No. PCT/CN2020/107998, filed on Aug. 7, 2020, the content of which is incorporated herein by reference in its entirety.

TECHNICAL FIELD

Embodiments of the present disclosure relate to the communication technical field, and more specifically, to a data transmission method and a terminal device.

BACKGROUND

In the New Radio (NR) system, a new Radio Resource Control (RRC) state, i.e., RRC_INACTIVE, is defined for the purpose of reducing air interface signaling and quickly resuming radio connectivity and quickly resuming data services. This state is different from the RRC_IDLE (idle) and RRC_CONNECTED (connected) states. For a UE in the RRC_INACTIVE state, radio bearers and all radio resources are released, but the terminal side and the base station side keep the access context of the terminal device, in order to quickly resume the RRC connection. The network usually keeps a terminal having infrequent data transmission in the RRC_INACTIVE state.

For an RRC_INACTIVE terminal, when Mobile Originated (MO) or Mobile Terminated (MT) data arrives, the terminal device needs to resume the connection and release to INACTIVE state after data transmission is completed. The MO data and the MT data are both for the terminal device. The MO data may refer to an uplink transmission initiated by the mobile terminal, and the MT data may refer to a downlink transmission received by the mobile terminal. For UEs with small data volume and low transmission frequency, such transmission mechanism leads to unnecessary power consumption and signaling overhead. Therefore, how to perform small data transmission to reduce the signaling overhead is an urgent problem to be solved.

SUMMARY

Embodiments of the present disclosure provide a data transmission method and a terminal device, which can perform a data transmission in an inactive state based on a preconfigured uplink resource or a random access resource so as to reduce signaling overhead.

According to a first aspect, there is provided a data transmission method, including: in response to that a terminal device selects to perform a data transmission in an inactive state based on a preconfigured uplink resource, sending, by the terminal device, uplink information to a network device, wherein the uplink information includes at least uplink data to be sent by the terminal device, or the uplink information includes at least the uplink data to be sent by the terminal device and identity information of the terminal device.

According to a second aspect, there is provided a data transmission method, including: in response to that a terminal device selects to perform a data transmission in an inactive state based on a random access resource, sending, by the terminal device, uplink information to a network device, wherein the uplink information includes at least uplink data to be sent by the terminal device and identity information of the terminal device.

According to a third aspect, there is provided a terminal device configured to perform the method according to the first aspect or any possible implementation of the first aspect. Specifically, the terminal device includes unit(s) configured to perform the method according to the first aspect or any possible implementation of the first aspect.

According to a fourth aspect, there is provided a terminal device configured to perform the method according to the first aspect or any possible implementation of the second aspect. Specifically, the terminal device includes unit(s) configured to perform the method according to the second aspect or any possible implementation of the second aspect.

According to a fifth aspect, there is provided a terminal device including: a processor and a memory, wherein the memory is used to store a computer program, and the processor is configured to call and run the computer program stored in the memory to perform the method according to the first aspect or any possible implementation of the first aspect.

According to a sixth aspect, there is provided a terminal device including: a processor and a memory, wherein the memory is used to store a computer program, and the processor is configured to call and run the computer program stored in the memory to perform the method according to the second aspect or any possible implementation of the second aspect.

According to a seventh aspect, there is provided a chip configured to perform the method according to the first or second aspect or any implementation of the first or second aspect.

Specifically, the chip includes a processor configured to call and run a computer program from a memory to cause a device in which the chip is installed to perform the method according to the first or second aspect or any implementation of the first or second aspect.

According to an eighth aspect, there is provided a computer-readable storage medium having a computer program stored thereon, wherein the computer program causes a computer to perform the method according to the first or second aspect or any implementation of the first or second aspect.

According to a ninth aspect, there is provided a computer program product including computer program instructions which cause a computer to perform the method according to the first or second aspect or any implementation of the first or second aspect.

According to a tenth aspect, there is provided a computer program which causes a computer to perform the method according to the first or second aspect or any implementation of the first or second aspect.

In the above technical solutions, when the terminal device performs a data transmission in an inactive state based on a preconfigured uplink resource, since the network side may or may not store a correspondence relationship between preconfigured uplink resources and identity information of terminal devices, the uplink information sent by the terminal device may or may not carry the identity information of the terminal device in addition to the uplink data to be transmitted, as long as the network device is able to identify the UE to achieve the data transmission in the inactive state based on the preconfigured uplink resource.

On the other hand, when the terminal device performs a data transmission in the inactive state based on a random access resource, because the random access resource is a shared resource in a cell, the network device cannot identify the terminal device through the random access resource, the uplink information sent by the terminal device should carry the identity information of the terminal device in addition to the uplink data to be transmitted, which is helpful to ensure that the network device can identify the UE, so as to realize the data transmission in the inactive state based on the random access resource.

BRIEF DESCRIPTION OF THE DRAWINGS

FIG. 5 is a schematic diagram of a data transmission method according to an embodiment of the present disclosure.

FIG. 6 is a schematic diagram of another data transmission method according to an embodiment of the present disclosure.

FIG. 7 is a schematic block diagram of a terminal device according to an embodiment of the present disclosure.

FIG. 8 is a schematic block diagram of another terminal device according to an embodiment of the present disclosure.

DETAILED DESCRIPTION

Figure 1:
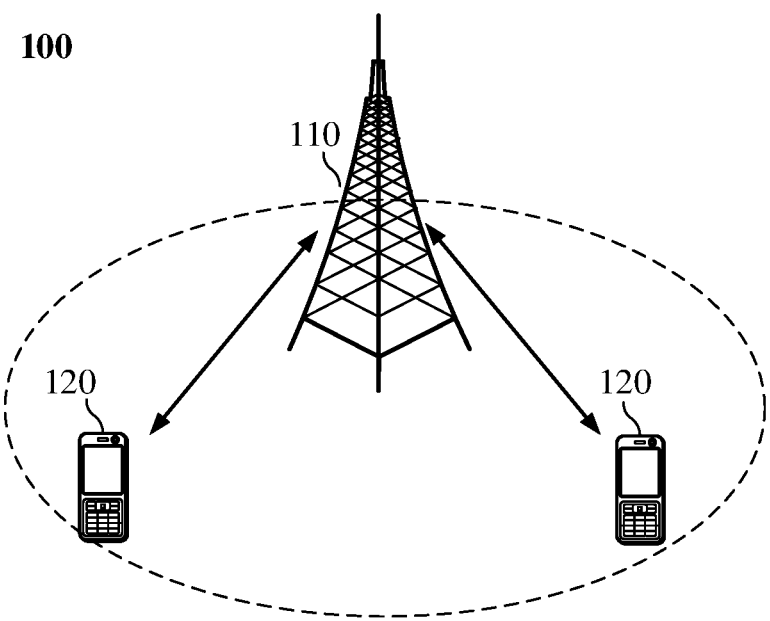
FIG. 1 is a schematic diagram of an application scenario according to an embodiment of the present disclosure.

The technical solutions in embodiments of the present disclosure will be described below with reference to the drawings in the embodiments of the present disclosure. Obviously, the described embodiments are part of the embodiments of the present disclosure, but not all of the embodiments. All other embodiments obtained by those of ordinary skill in the art based on the embodiments of described herein without creative work fall within the scope of protection of the present disclosure.

Technical solutions according to embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), Vehicle to Vehicle (V2V) communications, or Vehicle to everything (V2X), etc. Embodiments of the present disclosure can be applied to these communications systems.

Optionally, the communication systems in embodiments of the present disclosure can be applied to a Carrier Aggregation (CA) scenario, can also be applied to a Dual Connectivity (DC) scenario, and can also be applied to a standalone (SA) network deployment scenario.

Optionally, the communication system in embodiments of the present disclosure can be applied in unlicensed spectrum. The unlicensed spectrum may also be considered as shared spectrum. Or, the communication system in embodiments of the present disclosure can also be applied in licensed spectrum. The licensed spectrum may also be considered as non-shared spectrum.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB), or a relay station or an access point, or a vehicle-mounted device, a wearable device, a network device (gNB) in an NR network, or a network device in future evolved PLMN network or a network device in a NTN network.

By way of example and not limitation, in embodiments of the present disclosure, the network device may have mobile characteristics, for example, the network device may be a mobile device. Optionally, the network device may be a satellite, a or balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

Exemplarily, a communication system 100 to which embodiments of the present disclosure may be applied is shown in FIG. 1. The communication system 100 may include a network device 110. The network device 110 may be a device that communicates with a terminal device 120 (or referred to as a communication terminal, or a terminal). The network device 110 may provide communication coverage for a particular geographic area and may communicate with terminal devices within the coverage area.

FIG. 1 exemplarily shows one network device and two terminal devices. According to some embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller, or a mobility management entity, which are not limited in embodiments of the present disclosure.

It should be understood that a device having a communication function in the network/system in embodiments of the present disclosure may be referred to as a communication device. Taking the communication system 100 shown in FIG. 1 as an example, the communication device may include a network device 110 and terminal devices 120 with a communication function, and the network device 110 and the terminal devices 120 may be the specific devices described above, which will not be repeated here. The communication device may further include other devices in the communication system 100, such as other network entities like a network controller or a mobility management entity, which are not limited in embodiments of the present disclosure.

It should be understood that the terms "system" and "network" are often used interchangeably herein. The term "and/or" herein is only an association relationship to describe associated objects, indicating that there can be three kinds of relationships, for example, A and/or B can mean three cases: A alone, B alone, and A and B together. In addition, the character "/" herein generally indicates that the related objects are an "or" relationship.

It is to be understood that "indication/indicate" referred to in embodiments of the present disclosure may be a direct indication, an indirect indication, or representing an association relationship. For example, A indicates B can mean that A indicates B directly, for example, B may be obtained through A; or A indicates B can mean that A indicates B indirectly, for example, A indicates C and B may be obtained through C; or, A indicates B can mean that A and B have an association relationship.

In the description of embodiments of the present disclosure, the term "correspond/corresponding" may indicate a direct correspondence or indirect correspondence between two objects, or may indicate an association relationship between the two objects, or may be a relationship of indicating and being indicated, configuring and being configured, etc.

It should be understood that in embodiments of the present disclosure, NR may also be deployed independently. A new Radio Resource Control (RRC) state, RRC_INACTIVE state, is defined in the 5G network environment for the purpose of reducing air interface signaling and quickly restoring wireless connectivity and data services. This state is different from the RRC_IDLE (idle) state and RRC_CONNECTED state.

In the RRC_IDLE state: mobility is based on cell selection reselection of a terminal device, paging is initiated by the Core Network (CN), and the paging area is configured by the CN. There is no Access Stratum (AS) context for the terminal device on the base station side, and no RRC connection exists.

In the RRC_CONNECTED state: RRC connection exists, and AS context for the terminal device exists at the base station and the terminal device. The network device knows the location of the terminal device in a cell-specific level. Mobility is mobility controlled by the network device. Unicast data may be transmitted between the end device and the base station.

In the RRC_INACTIVE state: mobility is based on cell selection reselection of a terminal device, connection between CN-NR exists, AS context for the terminal device exists on a certain base station, paging is triggered by Radio Access Network (RAN), a RAN based paging area is managed by RAN, and the network device knows the location of terminal device in a RAN based paging area level.

It should be noted that in embodiments of the present disclosure, the inactive state may also be called a deactivated state, which is not limited in the present disclosure.

The network device may control the state transition of a terminal device. For example, a terminal device in the RRC_CONNECTED state may enter the RRC_IDLE state by releasing an RRC connection; a terminal device in the RRC_IDLE state may enter the RRC_CONNECTED state by establishing an RRC connection; a UE in the RRC_CONNECTED state may enter the RRC_INACTIVE state by release of RRC connection with suspend; a UE in the RRC_INACTIVE state may enter the RRC_CONNECTED state by resuming an RRC connection and may also enter the RRC_IDLE state by releasing and RRC connection.

Figure 2:
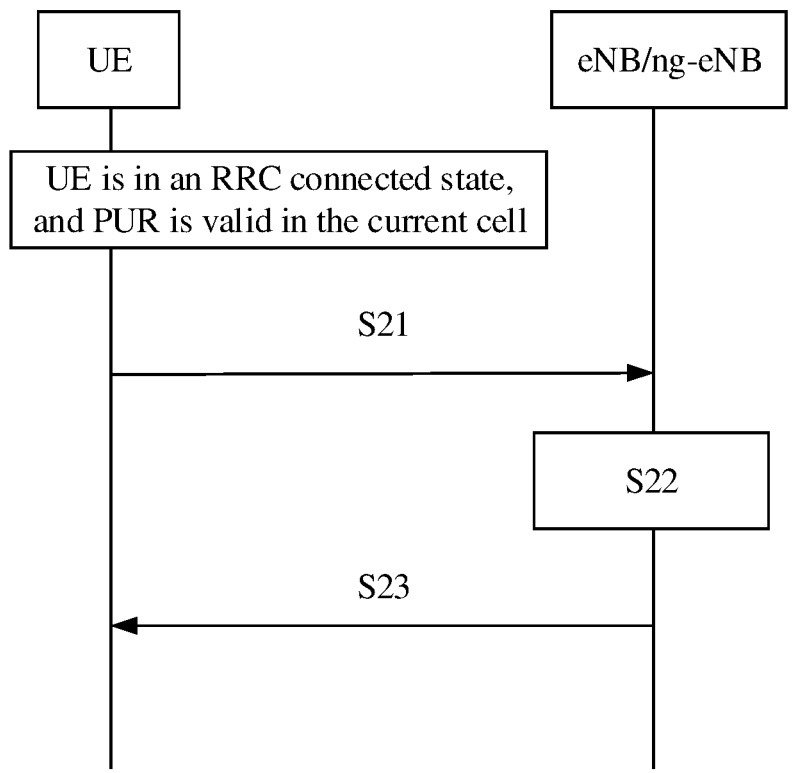
FIG. 2 is a schematic flowchart of a UE requesting a PUR.

For Narrow Band Internet of Things (NB-IoT) and enhanced Machine Type of Communication (eMTC) scenarios, LTE version 16 (Release16) introduces a method in which a data transmission is performed in an idle state using a Preconfigured Uplink Resource (PUR). FIG. 2 illustrates the configuration procedure of the PUR. Specifically, the UE is in a cell that supports PUR-based uplink transmission and the UE is in the connected state. In S21, the UE may send a PUR configuration request (PURConfigurationRequest) to a network device, such as an eNB or a next generation eNB (ng-eNB), for requesting the network device to configure the PUR.

Optionally, the PURConfigurationRequest may include at least one of: a period of the requested PUR, TBS, the number of PURs. The network device sends a PUR configuration to the UE via a Radio Resource Control (RRC) message, which may be, for example, an RRC connection release message (RRCConnectinRelease) message. The network device configures the PUR for the UE by including a PUR configuration field (PUR-Config) in the RRC message, while releasing the UE to the IDLE state. Optionally, the PUR configuration may be determined by the network device, or may be determined based on at least one of the UE's request, UE registration information and a local policy.

It should be noted that the PUR is only valid in the serving cell of the UE or in the cell where UE currently camps, and when the UE detects a change in the cell and initiates random access in a new cell, the UE needs to release the PUR configured by the original cell.

Before a UE in the IDLE state wants to use PUR for data transmission, the following prerequisite(s) needs(need) to be met:

1. A valid TA which needs to meet both the following two conditions:
 a. Timing Advance (TA) timer: After the Media Access Control (MAC) layer receives an indication from a higher layer, the TA timer is started. When determining the validity of the TA, the higher layer may confirm to the MAC layer whether the TA timer is running; when the TA timer expires, the MAC layer needs to give feedback to the higher layer. When the TA timer is running, the TA is considered to be valid; otherwise the TA is invalid.
 b. Reference Signal Receiving Power (RSRP) change: When the change of RSRP (increase or decrease) is larger than a set threshold, i.e., the change of RSRP is too large, the TA in this case is considered to be invalid; otherwise, the TA is considered to be valid.

2. A Next Hop Chaining Count (NCC) is configured on the UE. The NCC is used for the derivation of a new key. Optionally, the NCC may be configured by an RRC message, for example, the RRC message may be an RRC-ConnectionRelease message.

3. A valid PUR: i.e., the cell where the UE camps supports PUR and is configured with a PUR.

4. There is a demand for RRC connection establishment or resume, e.g. an uplink data arrival.

Figure 3:
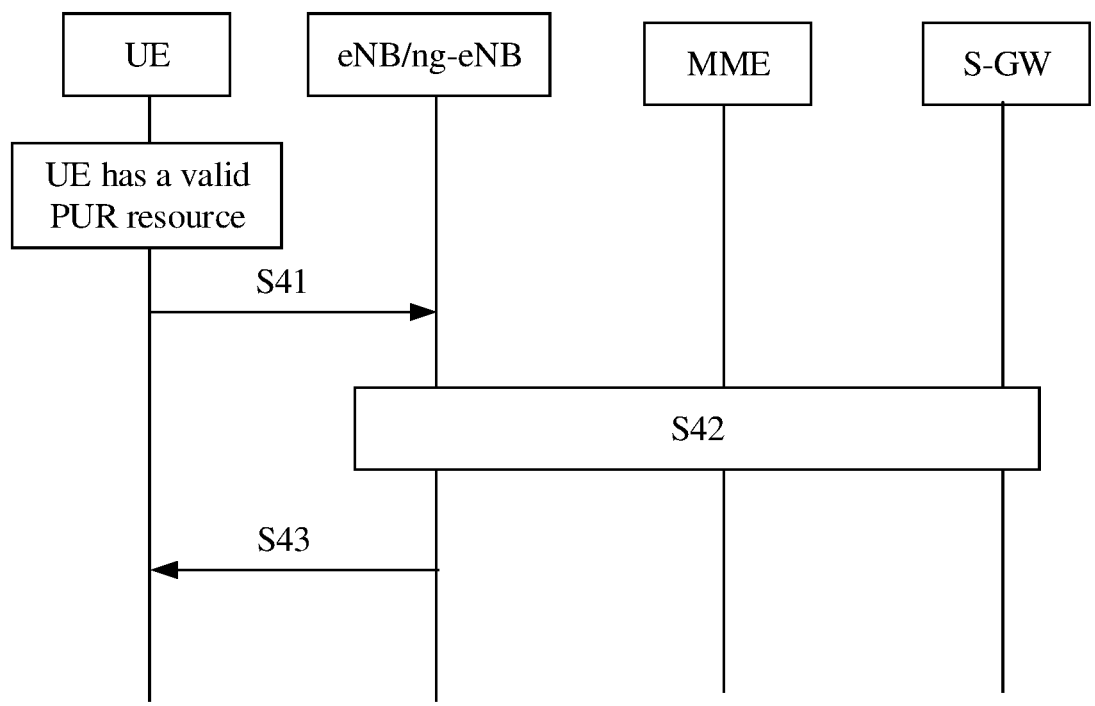
FIG. 3 is a schematic diagram of a data transmission using PUR.

With reference to FIG. 3, the flowchart of a data transmission using PUR for a UE in the IDLE state is illustrated.

The UE in the idle state may utilize the PUR for data transmission if the aforementioned prerequisite(s) is(are) met.

In S41, the UE sends an RRC message, such as an RRC connection resume request (RRCConnectionResumeRequest) message, to the network device, such as an eNB/ng-eNB.

Optionally, the RRC message may include: a resume ID (Resume ID) or Information RNTI (I-RNTI), an establishment cause, or a shortResumeMAC-I.

The Resume ID/I-RNTI is used by the network device to identify the context of the UE in the suspend state, and shortResumeMAC-I is used for the authentication of the UE.

Further, the UE resumes all Signaling Radio Bearers (SRBs) and Data Radio Bearers (DRBs). Using a new key derived based on NCC contained in the RRCConnectionRelease message of the last connection, the user data to be sent is encrypted and transmitted on the Dedicated Transmission Channel (DTCH) and is multiplexed with the RRCConnectionResumeRequest on the common control channel (CCCH).

In S42, the data transmission is performed between an access network device and a core network device.

The network devices may include an access network device (such as eNB, ng-eNB) and a core network device, such as Mobility Management Entity (MME) and Serving GateWay (S-GW).

After the access network device delivers the user data to the core network device, the eNB/ng-eNB further keeps the UE in the IDLE state by the RRCConnectionRelease message. The RRCConnectionRelease message may contain, for example, the following information:
 a) releaseCause being set to RRC suspend (rrc-Suspend);
 b) resume ID/I-RNTI;
 c) NCC;
 d) DRB continuous Robust Header Compression (ROHC), i.e., drb-ContinueROHC.

If there is downlink data sent on the network side, the data is encrypted and transmitted through DTCH and multiplexed with the RRCConnectionRelease message on DCCH.

Figure 4:
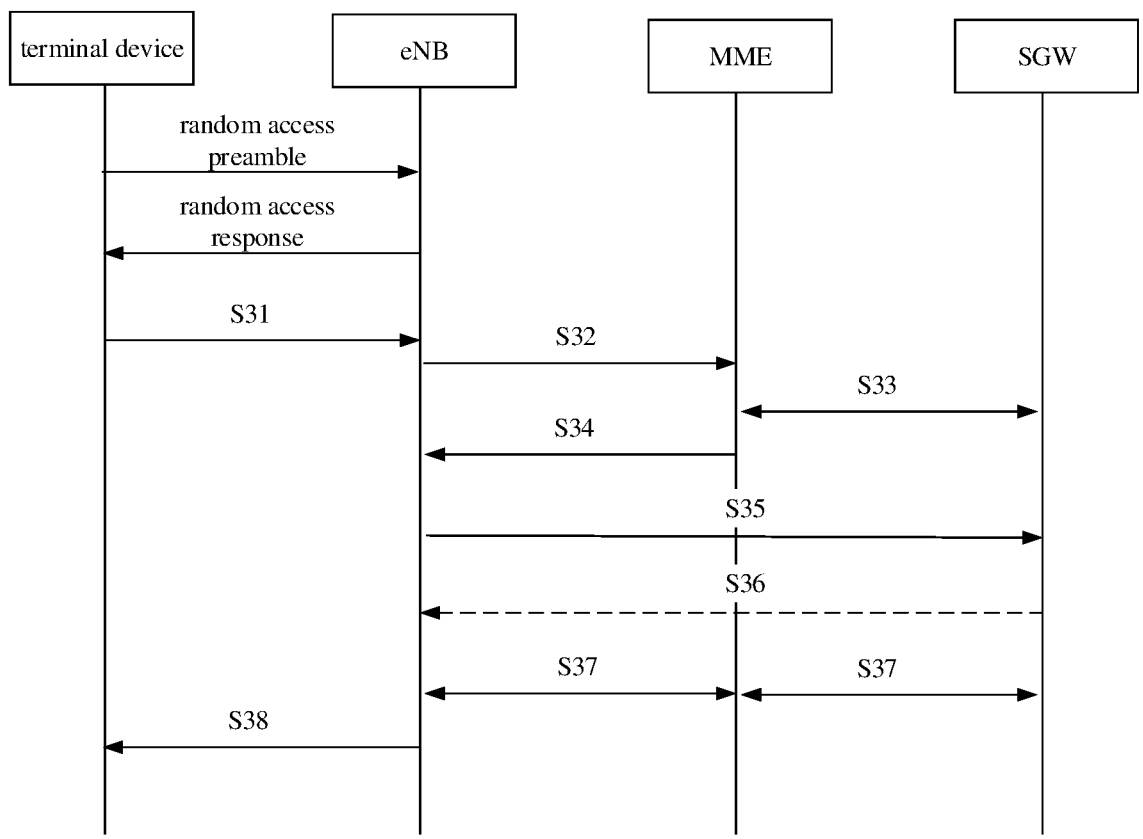
FIG. 4 is a schematic diagram of a data transmission using a random access resource.

In LTE system, early data transmission (EDT) is introduced. During the EDT procedure, the terminal device may always remain in idle state or suspend state or inactive state to complete the transmission of uplink and/or downlink small data packets. For example, as shown in FIG. 4, the user-plane data transmission scheme may be implemented specifically in the flow described in S31 to S38 below.

In S31, the UE sends an RRC connection resume request (Resume Request) to the eNB. The RRC connection resume request includes a Resume ID or Information RNTI (I-RNTI), an establishment cause, the shortResumeMAC-I. The RRC connection resume request also includes the uplink data sent by the UE (i.e., early data transmission).

In S32, the eNB sends a UE CONTEXT RESUME REQUEST to the Mobility Management Entity (MME).

In S33, a bearer between the MME and the Serving Gateway (SGW) is modified.

In S34, the MME sends a UE CONTEXT RESUME RESPONSE to the eNB.

In S35, the eNB sends to the SGW the uplink data sent by the UE (i.e. early data transmission).

In S36, the SGW receives the downlink data sent by the eNB (optionally).

In S37, the process between the eNB and the SGW is suspended, and the bearer between the MME and the SGW is modified.

In S38. the eNB sends an RRC connection release message to the UE, and optionally, the RRC connection release message includes downlink data.

It should be noted that for early data transmission, the UE actually completes the transmission of small data packets without entering the connected state, which is different from entering the connected state to transmit Mobile Broadband (MBB) services.

A random access resource is a resource shared in a cell, while the PUR resource is only valid in the currently configured cell. In this case, for a UE in the inactive state, how to perform data transmission is an urgent problem to be solved.

FIG. 5 is a schematic flowchart of a data transmission method 200 according to an embodiment of the present disclosure. The method 200 may be performed by a terminal device in the communication system shown in FIG. 1. As shown in FIG. 5, the method 200 may include at least some of the following:

In S210, in response to that the terminal device selects to perform a data transmission in an inactive state based on a preconfigured uplink resource, the terminal device sends uplink information to a network device. The uplink information includes at least uplink data to be sent by the terminal device, or the uplink information includes at least the uplink data to be sent by the terminal device and identity information of the terminal device.

Optionally, the preconfigured uplink resource PUR may be configured by a network device. The network device may configure the PUR on its own initiative, or may configure the PUR based on a request from the terminal device, registration information or a local policy, etc.

Optionally, in some embodiments, the uplink data may be EDT.

In some embodiments, the terminal device may select to perform the data transmission in the inactive state data based on the preconfigured uplink resource if a first trigger condition is met.

Optionally, the first trigger condition includes at least one of:
  a timing advance (TA) of the terminal device being valid;
  the terminal device being configured with a Next Hop Chaining Count (NCC);
  the preconfigured uplink resource for the terminal device being valid; and
  RRC connection establishment or resume being required, e.g., uplink data arrival.

The TA validity may be determined with reference to the relevant previous description.

Optionally, in some embodiments, the first trigger condition may also include that the terminal device supports PUR-based early data transmission, the network device supports PUR-based early data transmission, etc., and the present disclosure is not limited thereto.

When the terminal device selects to perform the PUR-based data transmission in the inactive state, the terminal device sends the uplink information to the network device. The specific contents included in the uplink information are described below.

Embodiment 1: the uplink information includes at least the uplink data to be sent.

In this case, the PUR used by the terminal device to send the uplink information and the identity information of the terminal device have a correspondence relationship. For example, the PUR may be configured per UE. The network device may identify the terminal device based on the PUR through which the uplink information is received. Thus, the terminal device may not have to send the identity information of the terminal device. In this case, the network side needs to store a correspondence relationship between PURs and identities of UEs.

Embodiment 2: the uplink information includes at least the uplink data to be sent and the identity information (ID) of the terminal device.

In this embodiment, the PUR used by the terminal device to send the uplink information and the identity information of the terminal device may not have a correspondence relationship, i.e. the network device cannot identify the terminal device based on the PUR through which the uplink information is received. Therefore, the terminal device may need to send the identity information of the terminal device. In this case, the network side does not need to store the correspondence relationship between PURs and identities of UEs.

It should be understood that in embodiment 2, the identity information of the terminal device may be carried in any uplink information or signaling sent to the network device together with the uplink data.

As an example, the uplink information includes an RRC message, and the identity information of the terminal device is included in the RRC message.

Optionally, the RRC message is an RRC resume request message, i.e., RRCResumeRequest.

In an example implementation, the uplink information is a Media Access Control (MAC) Protocol Data Unit (PDU). The MAC PDU includes a plurality of MAC sub-PDUs. The uplink data and the RRC message are contained in different MAC sub-PDUs in the MAC PDU. The uplink data may occupy one or more MAC sub-PDUs in the MAC PDU, and the RRC message may occupy one or more MAC sub-PDUs in the MAC PDU.

In this way, when sending the MAC PDU, the RRC message and the uplink data may be sent together to the network device, thus enabling a data transmission in an inactive state using the PUR.

As another example, the uplink information includes a Media Access Control Control Element (MAC CE), and the identity information of the terminal device is included in the MAC CE.

In some embodiments of the present disclosure, the terminal device may directly adopt embodiment 1 or 2 for PUR-based data transmission in an inactive state, or may adopt a specific approach for PUR-based data transmission in an inactive state based on an indication from the network device.

For example, the terminal device determines the content included in the uplink information based on first indication information sent by the network device. The first indication information is used to indicate the content of information to be carried by the terminal device for PUR-based transmission in the inactive state. In other words, the first indication information is used to indicate whether it is necessary to carry the identity information of the terminal device.

As an example, the first indication information is used to indicate that the uplink information includes at least uplink data; or
  the first indication information is used to indicate that the uplink information includes at least uplink data and the identity information of the terminal device.

As another example, the first indication information is used to indicate whether PUR-based data transmission in the inactive state carries the identity information of the terminal device.

Further, the first indication information may also indicate how the identity information of the terminal device is carried. That is, by what message or signaling the identity information of the terminal device is carried.

As an example, the first indication information is used to indicate that the identity information of the terminal device is carried in an RRC message or MAC CE.

Optionally, in some embodiments of the present disclosure, the first indication information is included in a first message, and the first message is used to configure the preconfigured uplink resource. That is, the network device may configure the PUR along with the information content to be sent when utilizing the PUR for data transmission in the inactive state.

A data transmission method according to an embodiment of the present disclosure is described above in connection with FIG. 5, and a data transmission method according to another embodiment of the present disclosure is described below in connection with FIG. 6.

FIG. 6 is a schematic flow diagram of a data transmission method 300 according to another embodiment of the present disclosure. The method 300 may be performed by a terminal device in the communication system shown in FIG. 1. As shown in FIG. 5, the method 300 includes the following:

In S310, in response to that a terminal device selects to perform a data transmission in an inactive state based on a random access resource, the terminal device sends uplink information to a network device. The uplink information includes at least uplink data to be sent by the terminal device and identity information of the terminal device.

In this embodiment, the random access resource may be shared in a cell, e.g. the network device may notify the UEs in a cell of resource(s) used for random access by means of broadcast, in which case the network device cannot identify a UE based on the random access resource through which the uplink information is received. Therefore, the terminal device needs to carry the identity information of the terminal device during data transmission in the inactive state based on the random access resource, so that the network device can identifies the UE.

In some embodiments, the terminal device may select to perform the data transmission in the inactive state data based on the preconfigured uplink resource when a second trigger condition is met.

Optionally, the second trigger condition includes that a data amount of the uplink data is smaller than a maximum data amount allowed to be transmitted as configured by the network device.

Optionally, the maximum data amount may be a maximum transport block (TB) size configured by the network device via a System Information Block (SIB), such as SIB2.

If the data amount of the uplink data is smaller than the broadcast maximum TB size, the terminal device may initiate an EDT transmission via a random access resource; otherwise, the terminal device uses a normal connection establishment procedure to enter the connected state to transmit the data.

Optionally, in embodiments of the present disclosure, the identity information of the terminal device may be carried in any uplink message or signaling sent to the network device together with the uplink data.

As an example, the uplink information includes an RRC message, and the identity information of the terminal device is included in the RRC message. Optionally, the RRC message is an RRC resume request message, i.e., RRCResumeRequest.

In an example implementation, the uplink information is a MAC PDU, and the MAC PDU includes a plurality of MAC sub-PDUs. The uplink data and the RRC message are contained in different MAC sub-PDUs in the MAC PDU. The uplink data may occupy one or more MAC sub-PDUs in the MAC PDU, and the RRC message may occupy one or more MAC sub-PDUs in the MAC PDU.

In this way, the RRC message and the uplink data may be sent together to the network device when the MAC PDU is sent, thereby enabling data transmission in an inactive state using the random access resource.

The method embodiments of the present disclosure are described in detail above in conjunction with FIGS. 5 to 6. The device embodiments of the present disclosure will be described in detail below in conjunction with FIGS. 7 to 10. It should be understood that the device embodiments and the method embodiments correspond to each other, and for similar descriptions, reference may be made to the method embodiments.

FIG. 7 is a schematic block diagram of a terminal device 400 according to an embodiment of the present disclosure. As shown in FIG. 7, the terminal device 400 includes a communication unit 410.

The communication unit 410 is configured to, in response to that a terminal device selects to perform a data transmission in an inactive state based on a preconfigured uplink resource, send uplink information to a network device, wherein the uplink information includes at least uplink data to be sent by the terminal device, or the uplink information includes at least the uplink data to be sent by the terminal device and identity information of the terminal device.

Optionally, in some embodiments, the uplink information includes a Radio Resource Control (RRC) message, and the identity information of the terminal device is included in the RRC message.

Optionally, in some embodiments, the RRC message is an RRC resume request message.

Optionally, in some embodiments, the uplink information is a Media Access Control (MAC) Protocol Data Unit (PDU), and the uplink data and the RRC message are included in different MAC sub-PDUs in the MAC PDU.

Optionally, in some embodiments, the uplink information includes a MAC Control Element (CE), and the identity information of the terminal device is included in the MAC CE.

Optionally, in some embodiments, the terminal device 400 further includes:
    a processing unit configured to determine a content included in the uplink information according to first indication information of the network device.

Optionally, in some embodiments, the first indication information is used to indicate that the uplink information includes at least the uplink data; or
    the first indication information is used to indicate that the uplink information includes at least the uplink data and the identity information of the terminal device.

Optionally, in some embodiments, the first indication information is further used to indicate how the identity information of the terminal device is carried.

Optionally, in some embodiments, the first indication information is used to indicate that the identity information of the terminal device is carried in an RRC message or a MAC CE.

Optionally, in some embodiments, the first indication information is included in a first message, and the first message is used to configure the preconfigured uplink resource.

Optionally, in some embodiments, the terminal device 400 further includes:

a processing unit configured to, in a case where a first trigger condition is met, select to perform the data transmission in the inactive state based on the preconfigured uplink resource.

Optionally, in some embodiments, the first trigger condition includes at least one of:

a timing advance (TA) of the terminal device being valid;

the terminal device being configured with a Next Hop Chaining Count (NCC);

the preconfigured uplink resource for the terminal device being valid; and

RRC connection establishment or resume being required.

Optionally, in some embodiments, the communication unit may be a communication interface or a transceiver, or an input/output interface of a communication chip or a system on chip. The processing unit may be one or more processors.

It should be understood that the terminal device 400 according to the embodiments of the present disclosure may correspond to the terminal device in the method embodiments of the present disclosure, and that the above and other operations and/or functions of the individual units in the terminal device 400 are respectively intended to implement the corresponding processes of the terminal device in the method 200 shown in FIG. 5, and repeated description is omitted here for brevity.

FIG. 8 is a schematic block diagram of another terminal device according to an embodiment of the present disclosure. The terminal device 500 in FIG. 8 includes a communication unit 510.

The communication unit 510 is configured to, in response to that a terminal device selects to perform a data transmission in an inactive state based on a random access resource, send uplink information to a network device, wherein the uplink information includes at least uplink data to be sent by the terminal device and identity information of the terminal device.

Optionally, in some embodiments, the uplink information includes a Radio Resource Control (RRC) message, and the identity information of the terminal device is included in the RRC message.

Optionally, in some embodiments, the RRC message is an RRC resume request message.

Optionally, in some embodiments, the uplink information is a Media Access Control (MAC) Protocol Data Unit (PDU), and the uplink data and the RRC message are included in different MAC sub-PDUs in the MAC PDU.

Optionally, in some embodiments, the terminal device 500 further includes:

a processing unit configured to, in a case where a second trigger condition is met, select to perform the data transmission in the inactive state based on the random access resource.

Optionally, in some embodiments, the second trigger condition includes:

a data amount of the uplink data being smaller than a maximum data amount allowed to be transmitted as configured by the network device.

Optionally, in some embodiments, the communication unit may be a communication interface or a transceiver, or an input/output interface of a communication chip or a system on chip. The processing unit may be one or more processors.

It should be understood that the terminal device 500 according to the embodiments of the present disclosure may correspond to the terminal device in the method embodiments of the present disclosure, and that the above and other operations and/or functions of the individual units in the terminal device 500 are respectively intended to implement the corresponding processes of the terminal device in the method 300 shown in FIG. 6, and repeated description is omitted here for brevity.

Figure 9:
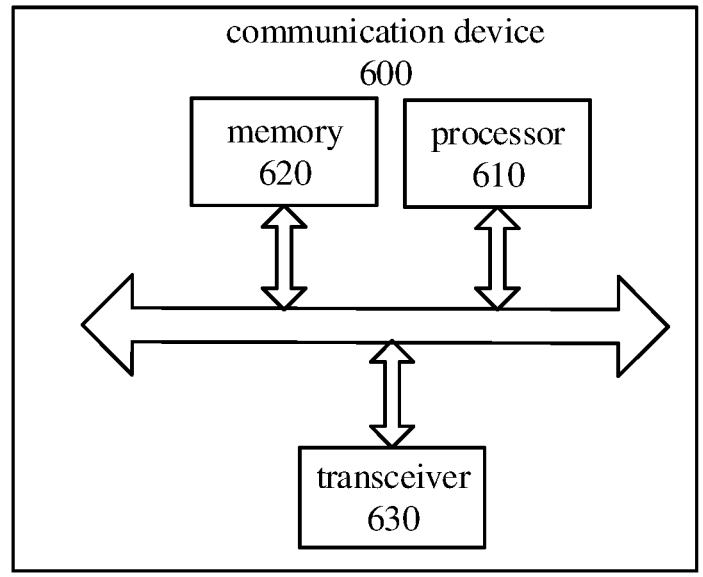
FIG. 9 is a schematic block diagram of a communication device according to an embodiment of the present disclosure.

FIG. 9 is a schematic structural diagram of a communication device 600 according to an embodiment of the present disclosure. The communication device 600 shown in FIG. 9 includes a processor 610, and the processor 610 may call and run a computer program from a memory to perform the method in embodiments of the present disclosure.

According to embodiments, as shown in FIG. 9, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 9, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device according to an embodiment of the present disclosure, and the communication device 600 may implement the corresponding processes implemented by the network device in the method embodiments of the present disclosure.

According to embodiments, the communication device 600 may specifically be the mobile terminal/terminal device in embodiments of the present disclosure, and the communication device 600 may implement the corresponding processes implemented by the mobile terminal/terminal device in the method embodiments of the present disclosure. For brevity, details are not repeated here.

Figure 10:
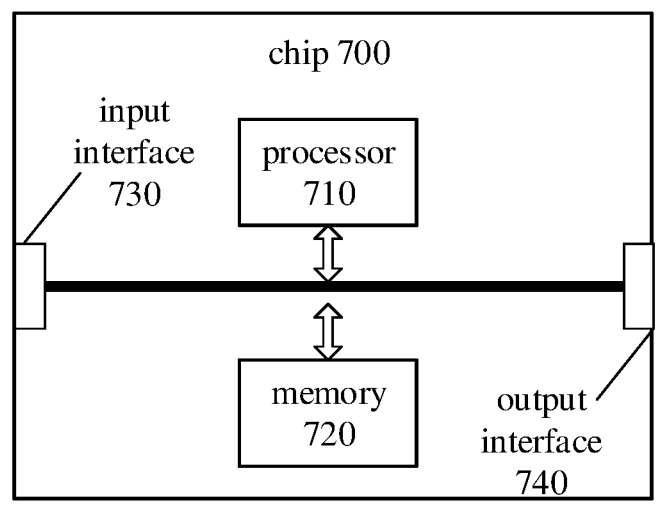
FIG. 10 is a schematic block diagram of a chip according to an embodiment of the present disclosure.

FIG. 10 is a schematic structural diagram of a chip according to an embodiment of the present disclosure. The chip 700 shown in FIG. 10 includes a processor 710, and the processor 710 can call and run a computer program from a memory to implement the method according to embodiments of the present disclosure.

According to embodiments, as shown in FIG. 10, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and specifically, the processor 710 can control the input interface to obtain information or data sent by other devices or chips.

According to embodiments, the chip 700 may further include an output interface 740. The processor 710 can control the output interface 740 to communicate with other devices or chips, and specifically, the processor 710 can control the output interface 740 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A data transmission method, comprising:
   in response to that a terminal device selects to perform a data transmission in an inactive state based on a preconfigured uplink resource, sending, by the terminal device, uplink information to a network device, wherein the uplink information comprises at least uplink data to be sent by the terminal device and identity information of the terminal device, the uplink information comprises a Radio Resource Control (RRC) message, the identity information of the terminal device is comprised in the RRC message, and the RRC message is an RRC resume request message.

2. The method according to claim 1, wherein the uplink information is a Media Access Control (MAC) Protocol Data Unit (PDU), and the uplink data and the RRC message are comprised in different MAC sub-PDUs in the MAC PDU.

3. The method according to claim 1, further comprising:
   determining, by the terminal device, a content comprised in the uplink information according to first indication information of the network device.

4. The method according to claim 3, wherein the first indication information is used to indicate that the uplink information comprises at least the uplink data; or
   the first indication information is used to indicate that the uplink information comprises at least the uplink data and the identity information of the terminal device.

5. The method according to claim 4, wherein the first indication information is further used to indicate how the identity information of the terminal device is carried.

6. The method according to claim 5, wherein the first indication information is used to indicate that the identity information of the terminal device is carried in an RRC message or a MAC CE.

7. The method according to claim 3, wherein the first indication information is comprised in a first message, and the first message is used to configure the preconfigured uplink resource.

8. The method according to claim 1, further comprising:
   in response to a first trigger condition being met, selecting, by the terminal device, to perform the data transmission in the inactive state based on the preconfigured uplink resource;
   wherein the first trigger condition comprises: a timing advance (TA) of the terminal device being valid.

9. The method according to claim 8, wherein the first trigger condition further comprises at least one of:
   the terminal device being configured with a Next Hop Chaining Count (NCC);
   the preconfigured uplink resource for the terminal device being valid; or
   RRC connection establishment or resume being required.

10. The method according to claim 1, wherein there is no correspondence relationship between the identity information of the terminal device and the preconfigured uplink resource, and the identity information of the terminal device is used for the network device to identity the terminal device.

11. A data transmission method, comprising:
    in response to that a terminal device selects to perform a data transmission in an inactive state based on a random access resource, sending, by the terminal device, uplink information to a network device, wherein the uplink information comprises at least uplink data to be sent by the terminal device and identity information of the terminal device;
    wherein the uplink information comprises a Radio Resource Control (RRC) message, the identity information of the terminal device is comprised in the RRC message, and the RRC message is an RRC resume request message.

12. The method according to claim 11, wherein the uplink information is a Media Access Control (MAC) Protocol Data Unit (PDU), and the uplink data and the RRC message are comprised in different MAC sub-PDUs in the MAC PDU.

13. The method according to claim 11, further comprising:
response to a second trigger condition being met, selecting, by the terminal device, to perform the data transmission in the inactive state based on the random access resource;
wherein the second trigger condition comprises:
a data amount of the uplink data being smaller than a maximum data amount allowed to be transmitted as configured by the network device.

14. The method according to claim 11, wherein there is no correspondence relationship between the identity information of the terminal device and the preconfigured uplink resource, and the identity information of the terminal device is used for the network device to identity the terminal device.

15. A terminal device, comprising:
a processor; and
a memory storing instructions executable by the processor;
wherein when the instructions are executed by the processor, the terminal device is caused to:
in response to that a terminal device selects to perform a data transmission in an inactive state based on a preconfigured uplink resource, send uplink information to a network device, wherein the uplink information comprises at least uplink data to be sent by the terminal device and identity information of the terminal device;
wherein the uplink information comprises a Radio Resource Control (RRC) message, the identity information of the terminal device is comprised in the RRC message, and the RRC message is an RRC resume request message.

16. The terminal device according to claim 15, wherein there is no correspondence relationship between the identity information of the terminal device and the preconfigured uplink resource, and the identity information of the terminal device is used for the network device to identity the terminal device.

17. The terminal device according to claim 15, wherein the uplink information is a Media Access Control (MAC) Protocol Data Unit (PDU), and the uplink data and the RRC message are comprised in different MAC sub-PDUs in the MAC PDU.

18. The terminal device according to claim 15, wherein when the instructions are executed by the processor, the terminal device is further caused to:
determine a content comprised in the uplink information according to first indication information of the network device.

19. The terminal device according to claim 18, wherein the first indication information is used to indicate that the uplink information comprises at least the uplink data; or
the first indication information is used to indicate that the uplink information comprises at least the uplink data and the identity information of the terminal device.

20. The terminal device according to claim 19, wherein the first indication information is further used to indicate how the identity information of the terminal device is carried.

* * * * *